Feb. 24, 1970     D. W. HERMANN     3,497,687
LENS ATTACHMENT FOR AUTOMOBILE HEADLIGHTS
Filed Aug. 30, 1967
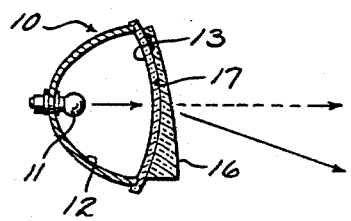
Fig. 1
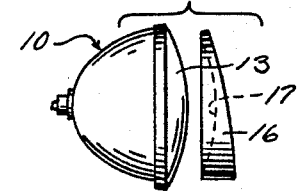
Fig. 2
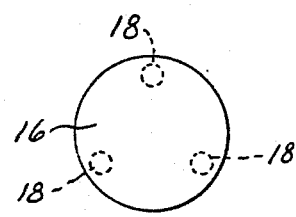
Fig. 3
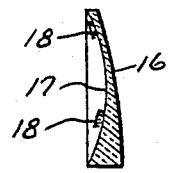
Fig. 4
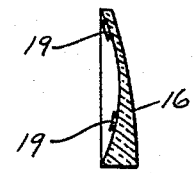
Fig. 5
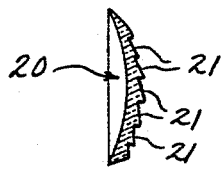
Fig. 6
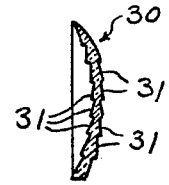
Fig. 7
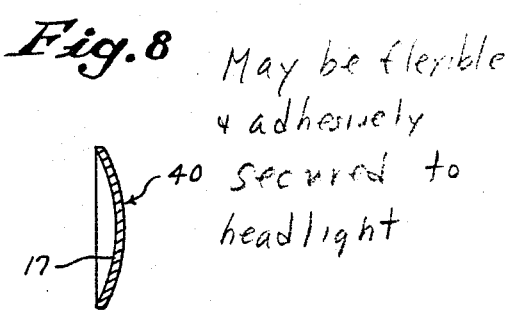
Fig. 8   May be flexible & adhesively secured to headlight
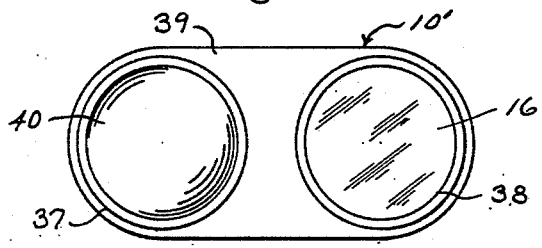
Fig. 9
INVENTOR
DONALD W. HERMANN
BY
*Morsell & Morsell*
ATTORNEYS United States Patent Office  3,497,687
Patented Feb. 24, 1970

3,497,687
LENS ATTACHMENT FOR AUTOMOBILE HEADLIGHTS
Donald W. Hermann, Milwaukee, Wis.
(1018 W. Lake Forest Court, Oak Creek, Wis. 53154)
Filed Aug. 30, 1967, Ser. No. 664,352
Int. Cl. F21v 13/04
U.S. Cl. 240—41.3                                          4 Claims

ABSTRACT OF THE DISCLOSURE

A prismatic lens attachment for use on automobile headlights to deflect normally elevated bright beams downwardly to prevent glare in the eyes of oncoming motorists. The prismatic lens attachment has a dished inner surface conforming to the shape of the headlight lens and is designed to fit over the exterior of the headlight lens. The prismatic lens has downwardly diverging inner and outer faces forming a wedge prism. The prismatic lens is designed to be removably secured to automobile headlights.

BACKGROUND OF THE INVENTION

Field of the invention

The present invention pertains to devices for altering the direction of an automobile headlight beam, and more particularly to a lens attachment causing the downward deflection of an automobile's bright lights for use in city driving in the event the car's regular driving lights are inoperative.

Description of the prior art

Heretofore, as far as applicant has been able to ascertain, no one has provided a removable lens attachment for automobile headlights which is designed to deflect the so-called bright headlight beams downwardly to prevent the same from interfering with the vision of approaching motorists. Lens attachments have been designed in the past for the purpose of converting a conventional headlight into a colored light for improved visibility in fog or inclement weather or the like, but no one has heretofore provided a detachable prism-like lens covering permitting the use of an automobile's bright headlight beams for city driving in the event of an emergency.

SUMMARY OF THE INVENTION

As hereinabove mentioned, when the regular or so-called city driving beam of an automobile headlight is burned out, as is periodically unavoidable, it is necessary to either drive without that light or to switch to the higher, bright headlight beams, which is equally dangerous in city driving or when passing an oncoming car on the highway because of the possibility of temporarily blinding the approaching driver.

To remedy this hazardous situation, the present invention comprises a transparent prismatic lens formed of a material having refractive properties which device can be quickly and easily mounted over the headlight of an automobile. Designed to bend the bright headlight beams downwardly so they won't shine in the eyes of approaching motorists, said lens coverings nevertheless provide adequate illumination of the roadway in front of the automobile to permit safe driving. Formed of low cost plastic material, said lens attachments are inexpensive to manufacture, and they are of a size and compactness permitting their convenient storge in the glove compartment or other handy location in a car for use in an emergency.

Further features of the present invention are that said lens attachment is durable and long-lasting, it is simple in design and construction, it is reliable in operation, and it is otherwise particularly well adapted for its intended purposes.

BRIEF DESCRIPTION OF THE DRAWING

In the drawing, wherein the same reference numerals designate that same or similar parts in all of the views:

FIG. 1 is a vertical sectional view of an automobile headlight having the novel lens attachment mounted thereon;

FIG. 2 is a side elevational view of the headlight and lens attachment in exploded relationship;

FIG. 3 is a front elevational view of the lens attachment;

FIG. 4 is a vertical sectional view of the lens attachment showing one type of means that can be utilized to secure said device on a headlight;

FIG. 5 is a similar sectional view showing another type of means for securing the device on a headlight;

FIG. 6 is a vertical sectional view through a modified form of the invention;

FIG. 7 is a sectional view of another modified form of the invention;

FIG. 8 is a sectional view of a non-transparent lens covering for use with cars having dual headlight units; and FIG. 9 is a front elevational view of a dual headlight unit utilizing the non-transparent lens attachment shown in FIG. 8.

DESCRIPTION OF THE PREFERRED EMBODIMENTS

Referring now more particularly to FIGS. 1 and 2 of the drawing, the numeral 10 designates a conventional automobile headlamp, including an incandescent light source 11 which may be of the dual-filament or other type ordinarily utilized in automobiles, a spherical inner reflector surface 12, and a concavo-convex glass lens 13. The exact design of said headlight may vary among different makes of autombiles, of course, and the present invention is by no means to be limited or confined to use with a particular make or style of headlight.

Mounted on and covering the exterior of the headlight lens 13 is the novel attachment device 16 comprising the present invention. Said lens attachment is ordinarily circular in plan view, but not necessarily, and is preferably made of acrylate or polystyrene, or comparable low-cost but durable transparent material having suitable refractive properties. As will be seen, in cross section said attachment is in the form of a wedge prism, diverging from a relatively narrow top to a substantially thicker base portion, and the illustrated embodiment of the invention is provided with a concave or dished inner surface 17 which is designed to conform to and fit snugly on the exterior face of the concavo-convex headlight lens 13. In lieu of said dished inner face 17 said lens attachment could be flat, however, and the invention is not to be limited in this respect.

The prismatic design of the present lens attachment is for the purpose of refracting or bending the light rays emanating from the source 11 downwardly, as is shown by the arrows in FIG. 1, and the degree of deflection is of course directly proportional at least for small angles to the angular relationship of the prism faces and the refractive index of the particular material used. In actual practice it has been found a downward deflection of a bright headlight beam approximately 2½° is sufficient to eliminate the hazard of said beam shining in the eyes of an oncoming motorist.

When acrylate plastic is used to form the lens attachment comprising the present invention, which material has an index of refraction of 1.5, an angle of about 5° between the diverging prism faces is sufficient, while a prism formed of polystyrene, which has an index of refraction of 1.6, requires a prism angle of 4°. It is to be understood, of course, that these calculations and suggested angular relationships are merely exemplary, and the invention is not to be limited in this respect. Obviously a greater or lesser angular deflection of the headlight beam could be employed with more or less satisfactory results, and the present invention is intended to cover not only the illustrated examples but also any and all variations as come within the spirit of said invention.

The means utilized for securing the prismatic attachment 16 on the face of a headlight can also be varied as desired. It is possible, for example, to use suction cups, such as the cups 18 illustrated in FIGS. 3 and 4, to secure said attachment in place on the lens, or tape 19 (FIG. 5) or other suitable adhesive means could be employed, as well as magnetic holding means or spring clips. In short, in accordance with the present invention it is possible to utilize any suitable mechanical holding device which will permit a driver to quickly and easily install and remove said lens attachments when desired, and the particular type of holding means employed is not a critical feature of the invention.

As hereinabove mentioned, in the event the regular driving beam of one or both of an automobile's headlights should burn out or become inoperative the driver can mount the prismatic lens attachment comprising the present invention on his headlights in a matter of seconds, and he can then utilize his bright lights without fear of blinding approaching motorists. Moreover, said downwardly-deflected lights provide more than adequate illumniation of the roadway in front of the car to permit safe driving until such time as the regular driving lights can be repaired.

In addition to the form of the invention illustrated in FIGS. 1–5, it is contemplated that various modified forms of said device might also be used. In FIG. 6, for example, there is shown a modified lens attachment 20 having an outer face provided with a plurality of vertically-spaced offset or stepped angular portions 21 which function as individual prisms. Said modified lens covering is designed to function in the same manner as the unitary prismatic attachment 16 illustrated in FIGS. 1–5, and requires less material.

In the use of a relatively thin prismatic covering such as that illustrated in FIG. 6, in order to secure said covering on a headlight several openings can be provided through said covering and pieces of transparent adhesive tape positioned thereover, said tape being adapted to be pressed through said openings to make contact with the headlight lens. To secure the lens attachment in place it is merely necessary to remove the protective covering from the inner, adhesive surface of said tape and press the same against the lens. It is to be understood, however, and as hereinabove mentioned, that any suitable means can be employed to secure the novel lens attachment comprising the present invention on a headlight, and the invention is not to be limited in this respect.

In FIG. 7 there is illustrated another modified lens covering, and in this form of the invention a relatively thin plastic sheet 30 is provided with a plurality of parallel, laterally-extending angular projections 31 which function as prisms. It is contemplated that said lens covering 30 could be formed of even thinner flexible plastic sheet or film material which would be designed to adhere to the face of a headlight lens, and which could be peeled therefrom when not required, the relatively low cost of such film material making a throw-away type of product feasible, if desired.

In FIGS. 8 and 9 of the drawing there is illustrated a non-transparent disc element 40 which is designed particularly for use with a dual headlight unit 10' (FIG. 9) such as is featured on many late-model automobiles. Said dual headlight unit includes a pair of laterally-spaced (or vertically-spaced) lights 37 and 38 carried in a housing 39, there being two of said double light units mounted on the front of a car. With this type of multiple headlight arrangement when the regular headlight beam is inoperative and said lights are switched to the bright beam it has been found that the use of all four of said bright lights is unnecessary in the city. Thus, one of said opaque discs 40 can be mounted over one of the lights of each of said dual-light units 10' and a prismatic lens attachment 16 mounted on the other light in each unit when it is necessary to use the bright lights for city driving. Said opaque discs and prismatic lenses can be supplied in a headlight conversion kit adapted to be stored in the glove compartment or other convenient location in a car.

From the foregoing detailed description it will be seen that the present invention provides novel means whereby a motorist can quickly and easily modify his bright headlight beams to make the same suitable for city driving in the event his regular city headlight beams fail. Moreover, the unique lens attachment characterizing the present invention is relatively inexpensive to manufacture, it is durable and long-lasting, and it is compact for convenient storage.

It is to be understood, as hereinabove emphasized, that while several preferred embodiments of the present invention have been illustrated and described herein, numerous variations or modifications thereof will undoubtedly occur to those skilled in the art, and it is intended to include herein not only the illustrated forms of said invention but also any and all forms thereof as may come within the spirit of said invention, and within the scope of the following claims.

What I claim is:

1. A conversion device for an automobile headlight lens of concavo-convex shape, comprising: a prismatic lens attachment formed of transparent material having refractive properties, said attachment being provided with a dished inner surface conforming to the concavo-convex shape of said headlight lens and being designed to fit in covering relation on and over the exterior of said headlight lens, said attachment having downwardly diverging inner and outer faces forming a wedge prism; and means for removably securing said attachment in covering relationship on the exterior of said headlight lens whereby bright light rays emanating from the headlight and passing through said prismatic lens attachment will be deflected downwardly thereby from their normal plane.

2. The device recited in claim 1 wherein said lens attachment has a plurality of individual prismatic elements formed thereon.

3. The device recited in claim 2 wherein said individual prismatic elements are in the form of vertically-spaced, laterally-extending stepped portions formed integrally on and covering the outer face of said lens attachment.

4. In an automobile dual headlight unit including a first headlight and a second, spaced headlight, said headlights having lenses of concavo-convex shape, a headlight conversion assembly comprising: a first lens attachment formed of transparent material having refractive properties, said lens attachment being prismatic in form and having a dished inner surface designed to conform to said first concavo-convex headlight lens; means for removably securing said attachment in covering relationship on the exterior of the lens on said first headlight, whereby bright light rays emanating from said headlight and passing through said prismatic lens attachment will be deflected downwardly thereby from their normal plane; and a second lens covering attachment formed of opaque material and having a dished inner surface designed to conform to said second headlight concavo-convex lens; and means for removably securing said opaque covering over the lens of said second headlight to prevent light from passing therethrough.

(References on following page)

References Cited

UNITED STATES PATENTS

| | | | |
|---|---|---|---|
| 1,273,192 | 7/1918 | Smith | 240—106.1 XR |
| 2,332,470 | 10/1943 | Richards | 240—46.59 |
| 2,499,555 | 3/1950 | Wronkowski | 240—46.59 |
| 2,499,731 | 3/1950 | Derington | 240—100 XR |
| 2,544,378 | 3/1951 | Cyr | 240—46.59 |
| 2,760,051 | 8/1956 | Schmidt | 240—41.4 XR |

FOREIGN PATENTS 449,292    6/1936    Great Britain.

NORTON ANSHER, Primary Examiner

ROBERT P. GREINER, Assistant Examiner

U.S. Cl. X.R.

240—106.1